2,923,051
Patented Feb. 2, 1960

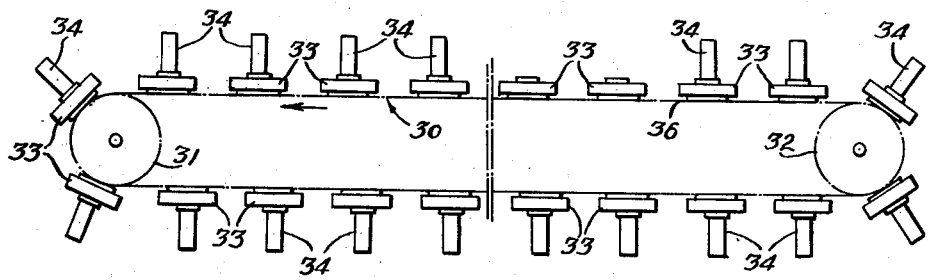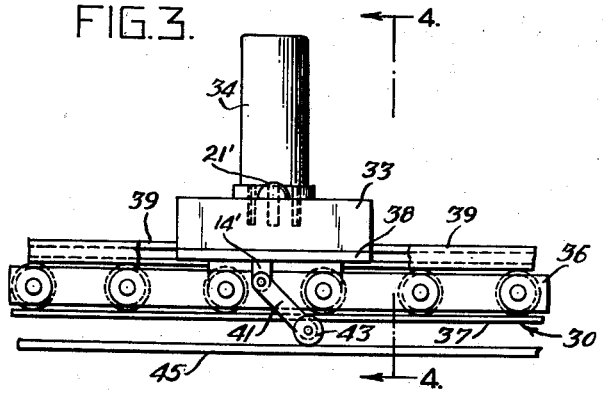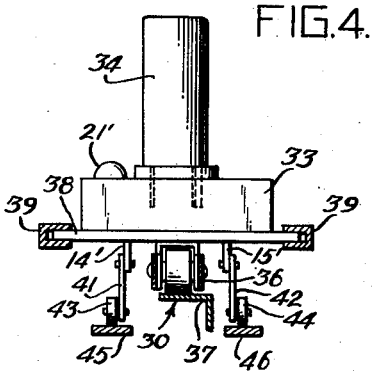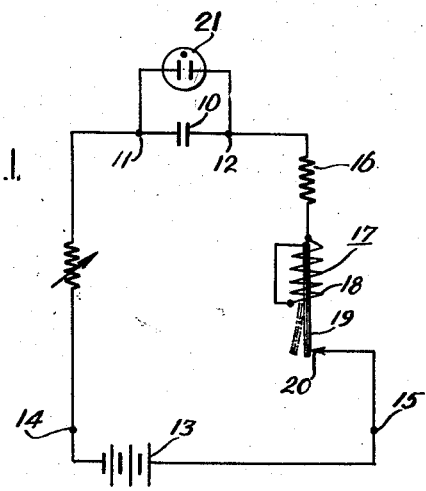
Feb. 2, 1960     C. L. WELLINGTON     2,923,051
METHOD OF AND DEVICE FOR AGING CAPACITORS
Filed May 31, 1956
INVENTOR:
CARY L. WELLINGTON
BY
Howson & Howson
ATTYS.

United States Patent Office

2,923,051
METHOD OF AND DEVICE FOR AGING CAPACITORS

Cary L. Wellington, Stamford, Conn., assignor to The Condenser Machinery Corp., Englewood, N.J., a corporation of New York Application May 31, 1956, Serial No. 588,540

12 Claims. (Cl. 29—25.31)

This invention relates to a novel method of aging electrolytic capacitors and specifically to a method which permits aging at a maximum rate without danger of destruction by thermal overload of the capacitor. This invention relates also to a device for aging condensers and to a machine for simultaneously aging a plurality of condensers in accordance with the method of the present invention.

At least one of each possible pair of electrodes of an electrolytic capacitor must be formed, i.e., provided with a non-conducting oxide coating, in order to minimize conduction through the capacitor, and this coating must be continuous over the whole surface of the electrode. As a practical matter, however, such a continuous coating of oxide, even if obtained in the forming process, is impossible to maintain during the handling which accompanies assembly of the capacitor and must be restored in part by "aging" after the capacitor has been partially or completely assembled.

Heretofore, aging has been accomplished by placing the capacitor to be aged in series with a current-limiting resistance in order to keep the current density in the capacitor below the level at which destruction would occur by thermal run-away. When aging a capacitor in this manner, as the aging progresses, the resistance of the capacitor increases until the resistance of the capacitor is much greater than that of the current-limiting impedance so that current is materially reduced and aging progresses more slowly as time goes on. The long period of time required to complete aging makes this standard process costly because it prevents the use of the equipment for other work and to some extent requires the attention of attendants over the long aging period. Moreover, it is productive of an oxide coating which is much inferior to coatings produced by forming, and this inferior dielectric barrier tends to deteriorate early in the expected life of the capacitor.

The present invention relates to a novel method of aging capacitors, which causes aging to progress at a faster rate than methods used heretofore. Using the method of the present invention no more attendants are required than with prior art devices and the attendants and machinery are occupied with the aging for a much shorter period of time. Moreover, the method of the present invention produces an oxide coating superior to that produced by aging techniques in the past and of a quality much closer to that produced by forming.

In particular, the method of the present invention comprises repeatedly applying across the capacitor terminal pulses of up to full rated voltage, the pulses being spaced sufficiently far apart in time to limit energy input to within the thermal tolerances of the capacitor. Control of the energy applied to the capacitor can be had by controlling the length of the pulse relative to the spacing between pulses, by controlling the spacing between pulses of a given length, or by a combination of these two methods.

Many devices for practicing the method of the present invention are possible, but one type is particularly desirable since it is unusually simple in structure and is essentially self-regulating so that only a minimum of attention to it is needed.

Specifically, this preferred aging device of the present invention comprises an electric circuit having a voltage source. Support-connectors are provided for connecting capacitors to be aged in series with the voltage source and an element is arranged in series with a capacitor being aged across the capacitor support-connectors for limiting the energy dissipated in said capacitor. The element serving to limit energy expended in the capacitor is a switch suitable for opening and closing the circuit in order to limit the amount of energy flowing to a capacitor over a period of time and hence prevent thermal overload.

The present invention lends itself to mass production techniques and a machine using the device of the present invention in multiple constitutes part of the invention. This device consists of a conveyor having a plurality of mounting spaced along the conveyor, each mounting having at least a pair of support-connectors. Each mounting is provided with conductors connecting each of the support-connectors to a voltage supply such that a capacitor plugged into a mounting or otherwise connected across the support-connectors will have aging voltage applied to it.

For a better understanding of the present invention, reference is made to the following drawings, in which:

Fig. 1 is a circuit diagram of a preferred device of the present invention;

Fig. 2 shows in plan a machine in accordance with the present invention employing a plurality of devices of the present invention;

Fig. 3 is an enlarged view showing in more detail a portion of the conveyor of Fig. 2 and one of the mountings on the conveyor; and Fig. 4 is a view taken along line 4—4 of Fig. 3.

Referring to Fig. 1, a circuit diagram of a preferred device is shown with a capacitor 10 to be aged in place. The capacitor 10 is connected across conductor-support terminals 11 and 12. A voltage source 13 selected to impose no more than full rated voltage for capacitor 10 across said capacitor is connected across terminals 14 and 15. Between terminals 12 and 15 is connected the energy-limiting element, generally designated 17. A current-limiting impedance 16 may be included between terminals 12 and 15 in series with element 17 under certain conditions. Element 17 consists of a heater element 18 connected in series with a thermomotive member 19 which is preferably a bimetallic element. Thermomotive member 19 has one end anchored and its other end, which is left free to move, carries one switch contact. The other switch contact 20 is fixed relative to the fixed end of the thermomotive member and the contacts are normally closed. A signal light 21 is connected between terminals 11 and 12.

The circuit elements of Fig. 1 are preferably selected such that approximately full rated voltage may be applied across capacitor 10 while it is being aged at the beginning of the aging process. Thermal destruction of capacitor 10 is the limiting factor of the amount of energy which can be applied to the capacitor in this case. The energy consumed by a capacitor in any aging process is approximately the product of the square of the current flowing through the capacitor, the effective resistance of the capacitor and the time which the current flows. The same energy considerations are present in connection with heating element 18, the primary difference being that the resistance of capacitor 10 increases in the course of aging whereas the resistance of element 18 is essentially constant. Accordingly, as heater element 18 heats up, the capacitor 10 heats up. The heater element is located relative to the thermomotive member 19, which is preferably a bimetal element in series with the heater element 18. The bimetal element may be spring loaded or otherwise held in place so that the contact which it bears contacts fixed contact 20 under normal circumstances and the switch is normally closed. As heating of element 18 occurs, the bimetal member 19 is caused to flex and the contacts are broken. Upon cooling, however, the bimetal element returns to its initial closed contact position and the heating cycle is repeated. Thus, it will be observed that the amount of heating may be limited in any desirable way by the choice of a bimetal or other thermomotive element which has properties found suitable for aging a particular capacitor. This choice will determine how much of the time the current flows through the capacitor 14. Proper selection of the thermomotive member makes it possible to apply fully rated voltage to the capacitor being aged for a limited time. Since energy tending to thermally destroy the capacitor is a function of time as previously explained, overheating can be prevented by applying full rated voltage but limiting it to pulses of a duration short enough and with sufficient time between pulses that thermal energy tolerances will not be exceeded. In this way the good effects of applying full rated voltage to the capacitor being aged such as better quality oxide coating, are obtained without adverse effect.

As the resistance of the capacitor increases, the current flowing through it decreases and hence the time it takes to open the switch increases, due to the decreased heating effect of heater element 18. Thus while current is decreased and hence the heating effect due to the square of the current is materially decreased, it is partially compensated by the increase in the length of pulses and the increased resistance of the capacitor so that aging continues at a very rapid rate and full rated voltage may be continuously applied. In order to level the effect of decrease of current a large resistor is introduced in series with capacitor 10 and element 17, so that the impedance of the resistor has more effect on the current than the changing impedance of the capacitor. Thus the change in current can be minimized so that the energy level can be maintained just within thermal tolerances throughout aging if desired.

The signal means 21 is preferably a neon light. This light will initially tend to flash on and off quite frequently as the switch 19—20 opens and shuts, but ultimately as a capacitor reaches its full mature aging, the contacts of the switch will open less and less frequently and an attendant can observe by this effect when a capacitor has completed aging. An attendant can, of course, tell aurally by listening to the clicking of the switch 19—20 whether the capacitor is aged, but where many capacitors are being aged at once, it is less confusing to have a signal light instead of relying on aural identification to find the proper aging time.

Fig. 2 illustrates a machine for aging a plurality of capacitors at one time. This machine consists of a frame on which is supported a movable conveyor of some endless variety. For example, in Fig. 2 conveyor 30 is mounted on rotatable supports 31 and 32. At least one of these supports, say 31, is driven in order to impart movement to the conveyor. Mounted on the conveyor are mountings 33 for capacitors 34, which advantageously may be plugged directly into the mountings. Each of the mountings includes a complete aging device, for example that of Fig. 1, down to terminals 14 and 15. In fact, in some cases, more than one aging device may be employed for a capacitor having more than two electrodes. For the sake of simplicity, a machine for aging two electrode capacitors will be described, it being understood that machines for multiple electrode capacitors are merely an extension of the machine to be described, Referring to Figs. 3 and 4, it will be seen that conveyor 30 in this particular application is a chain conveyor 36 running on a supporting rail 37. Fixed to the chain at intervals are sheet-like platforms 38 each of which mounts a mounting 33 for a capacitor. The platforms 38 may be steadied by having their edges engaged in U-shaped tracks or guides 39 which are supported on the frame to extend along the straight portions of the conveyor, but which terminate in advance of the portions of the conveyor going around the sprockets 31, 32. The conveyor may be mounted either horizontally or vertically, whichever is more convenient, in a particular installation, for plugging in and removing capacitors. Extending from the mounting 33 are a pair of terminals 14′, 15′ in the form of rigid bars. Pivotally and conductively connected to these rigid bars are a pair of arms 41, 42, respectively, which, in turn, carry roller-type brushes 43, 44, respectively. In addition to their pivotal connection, the members 41, 42 are spring connected to terminals 14′, 15′, respectively, so that the brushes 43 and 44 are urged against bus bars 45, 46, respectively, which are supported on the frame and connected across a constant voltage supply (not shown) of rated voltage for the particular capacitor electrodes to be aged. If each mounting 33 contains a complete device according to Fig. 1, it contains only those elements between terminals 11 and 14 and between terminals 12 and 15, respectively. A signal light 21′ may be mounted in a position to be clearly visible to an attendant who is manning a machine. It may be desirable to have one or two attendants on a machine. One attendant will plug capacitors into each of the mountings 33 as it goes by. Another attendant, or the same attendant in some instances, will remove capacitors as they pass the removal station along the conveyor path with the signal light 21′ constantly glowing. The length of the conveyor 30 is advantageously selected such that the distance between the plug-in and removal stations is such that at the normal speed of operation, the average capacitor will have fully aged. Those capacitors requiring additional aging may make another complete revolution of the conveyor.

A typical D.C. aluminum electrolytic capacitor having four anode sections rated 40+40 μf. at 450 v. D.C. and 30+30 μf. at 350 v. D.C. has a cathode .001 inch thick, 3½″ wide and 7 feet 1 inch long and anodes .003 inch thick, 3″ wide, and 22¼″, 22½″, 15%16″ and 15⅝″ long respectively and 3 thicknesses of .001 inch Benares paper between the cathode and the anodes which together with the electrolyte make a total spacing of .0035 inch between each of the anodes and the cathode. The electrolyte of this typical capacitor is a mixture of two or more salts which at room temperature are a soft plastic paste, such as, for example, a mixture of ammonium acetate (85 parts) and potassium dichromate (15 parts), although the exact composition of the electrolyte in the typical capacitor under consideration is not important. The completed capacitor is placed in a cylindrical casing 4″ high and 1¾″ diameter.

Aging of these typical capacitors by the prior art method involves placing a 1 megohm resistance in series with the capacitor before applying rated voltage and took approximately 10–24 hours by actual test. Even using prior art techniques, considerable time is saved by so-called "batch" aging of the capacitors whereby a group of capacitors are put in a common tank containing an electrolyte solution before being placed in their permanent enclosure and each connected in series with a large resistance for aging in that tank. Batch aging of the typical capacitor under consideration in accordance with the practice of the prior art required about four to five hours.

Using the present invention, aging of this same typical capacitor can be accomplished in less than an hour with the capacitor already completely assembled in casing. Even shorter aging periods are possible with the present invention where batch aging is employed. In accordance with the present invention, one group of capacitors was aged by employing almost full rated voltage pulses to produce current through each capacitor such that the power consumed by that capacitor was less than the amount which would overheat it and cause thermal runaway. Initially the length of full rated voltage pulses was approximately one-tenth as long as period between pulses, and the pulse length increased as aging progressed.

Although the devices of the present invention provide convenient means of making electrolytic capacitors, it will be understood that in accordance with the present invention capacitors may be made without using the specific devices described or other devices within the scope of the claims which will occur to those skilled in the art. Any method of applying high current pulses by any means whatsoever is within the scope of the method of the present invention. It will be understood that thermal tolerances may be observed by regulating either the length of the pulse or the length of the period between pulses, or by both.

I claim:

1. The method of healing unformed surfaces constituting a small proportion of the total area of electrodes in a completed electrolytic capacitor comprising initially and repeatedly applying across the capacitor terminals high current density short pulse length pulses of close to and up to full rated voltage, the pulses being spaced sufficiently far apart to limit energy input to within thermal tolerances of the capacitor.

2. The method of healing unformed surfaces constituting a small proportion of the total area of electrodes in a completed electrolytic capacitor comprising initially and repeatedly applying across the capacitor terminals high current density short pulse length pulses of at least one half full rated voltage, the pulses being spaced sufficiently far apart to limit energy input to within the thermal tolerances of the capacitor.

3. The method of claim 1 in which the pulse length is increased as the current through the capacitor decreases while keeping the time between pulses constant.

4. The method of claim 1 in which the time between pulses is increased as the current through the capacitor decreases, while keeping the pulse length constant.

5. The method of claim 1 in which both the pulse length and the time between pulses is varied to maintain the power input into the capacitor close to the maximum thermal tolerance as the current decreases.

6. The method of claim 1 in which the distance between the leading edges of the pulses is kept constant.

7. A device for healing uniformed surfaces in electrolytic capacitors comprising an electrical circuit having a voltage source of a size to permit initial application of a high current density voltage up to full rated voltage for the capacitor being aged, support-connectors for connecting a capacitor in series with the voltage source, a switch arranged to be in series with the constant voltage source and a capacitor being aged across the support-connectors, said switch enabling the current through the capacitor to be periodically interrupted to keep the heat of the capacitor within thermal tolerances, and means responsive to the rate of current flow in the capacitor being aged to automatically operate said switch.

8. The device of claim 7 in which the switch is normally closed and is opened in response to a thermal element arranged to be in series with a capacitor being aged.

9. The device of claim 8 in which the switch includes a thermomotive element which is positioned to be heated by a heater resistor arranged to be in series with a capacitor being aged, said thermomotive member acting to open the switch contacts in response to heating of the resistor due to current flow.

10. The device of claim 7 in which an impedance element is placed in series with the switch so that it will be in series with a capacitor being aged and an actuating device for opening the switch is placed across the impedance in order to open the switch after the period of time required for the current which produces the voltage drop across the impedance to produce an amount of heating of the capacitor within the heating tolerances.

11. A machine for healing unformed surfaces in a plurality of capacitors comprising a conveyor, a plurality of mountings each having at least a pair of support-connectors spaced along the conveyor, conductors connecting each support-connector to a voltage supply such that a capacitor connected across support-connectors will have aging voltage applied to it and switch means on each mounting connected in series with the support connectors and adapted to automatically open and close in response to current flow through a capacitor connected between the support connectors.

12. The machine of claim 11 in which each switch includes a thermomotive member acting in response to heating a resistance arranged to be in series with a capacitor being aged such that heating of said thermomotive member causes the switch to open and cooling causes it to close.

References Cited in the file of this patent

UNITED STATES PATENTS

| | | |
|---|---|---|
| 1,337,245 | Mcpherson | Apr. 20, 1920 |
| 2,151,806 | Schnoll et al. | Mar. 28, 1939 |
| 2,290,163 | Brennan | July 21, 1942 |
| 2,440,297 | Riecken | Apr. 27, 1948 |

UNITED STATES PATENT OFFICE

CERTIFICATE OF CORRECTION

Patent No. 2,923,051 February 2, 1960

Cary L. Wellington

It is hereby certified that error appears in the printed specification of the above numbered patent requiring correction and that the said Letters Patent should read as corrected below.

Column 3, line 20, for "fully" read -- full --; column 5, line 43, for "is increased" read -- is decreased --.

Signed and sealed this 19th day of July 1960.

(SEAL)
Attest:
KARL H. AXLINE
Attesting Officer

ROBERT C. WATSON
Commissioner of Patents